United States Patent Office 2,819,271
Patented Jan. 7, 1958

2,819,271
METHYL RESERPATE O-TRIACETYLSHIKIMATE

Jacob Szmuszkovicz, Portage Township, Kalamazoo County, Mich., assignor to The Upjohn Company, Kalamazoo, Mich., a corporation of Michigan No Drawing. Application June 22, 1956
Serial No. 593,026

1 Claim. (Cl. 260—287)

The present invention is concerned with physiologically active chemical compounds related to reserpine and is more particularly concerned with methyl reserpate O-triacetylshikimate represented by the following formula:

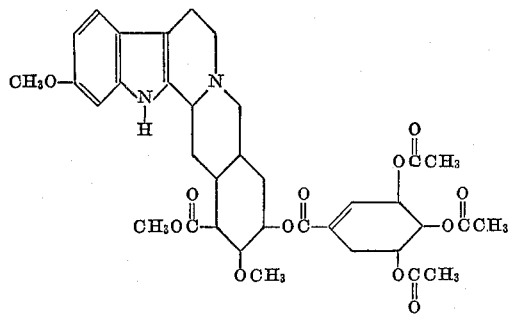

It is an object of the present invention to provide methyl reserpate O-triacetylshikimate which is a physiologically active agent of high potency having hypotensive and sedative properties and which has a superior ratio of hypotensive to sedative activity and a superior therapeutic ratio when compared with reserpine. The compound of the present invention can be substituted for reserpine in known reserpine-containing pharmaceutical compositions such as tablets, injectables, and elixirs. Other objects and uses of the present invention will be apparent to one skilled in the art.

The methyl reserpate O-triacetylshikimate of the present invention is obtained by esterification of methyl reserpate to introduce the triacetylshikimate radical, as more fully illustrated by the example below. The starting methyl reserpate is prepared by methanolysis of reserpine with sodium methoxide according to the procedure of Dorfmann et al. recorded in Helv. Chim. Acta, 37, 59 (1954). The triacetylshikimoyl chloride is prepared by reaction of triacetylshikimic acid with oxalyl chloride in benzene solvent with a trace amount of pyridine as catalyst the triacetylshikimic acid being prepared by acetylating shikimic acid [Fischer and Dangschat, Helv. Chim. Acta, 18, 1206 (1935)]. Within the meaning of the term "methyl reserpate O-triacetylshikimate" and the scope of this invention is included the free base, acid addition salts such as the sulfates, hydrochloride, phosphates, hydrobromide, acetate, propionate, benzoate, maleates, succinates, phenylacetate, β-cyclopentylpropionate, etc., and quaternary ammonium salts obtained by reaction of the free base with organic halides such as methyl iodide, ethyl bromide, benzyl chloride, etc.

The following example is illustrative only and is not to be construed as limiting the scope of the present invention.

Example

To a solution of 1.82 millimoles of shikimoyl chloride in ten milliliters of benzene is added, dropwise, a solution of 1.25 millimoles of methyl reserpate in seven milliliters of pyridine and the resulting mixture maintained at room temperature for 18 hours. The mixture then is cooled in an ice bath, water is added, and the aqueous mixture extracted with benzene. The benzene extract is washed with water and saturated aqueous sodium chloride solution, dried over anhydrous sodium sulfate solution, and evaporated to dryness giving 0.89 gram of a yellow powder. Recrystallized from a benzene-ether-petroleum ether mixture the methyl reserpate O-triacetylshikimate product melts at 145 to 150 degrees centigrade.

I claim:
Methyl reserpate O-triacetylshikimate.

No references cited.